United States Patent
Qian et al.

(10) Patent No.: US 8,698,082 B2
(45) Date of Patent: Apr. 15, 2014

(54) HIGH-FIDELITY DEVICE FOR SINGLE-SHOT PULSE CONTRAST MEASUREMENT BASED ON QUASI-PHASE-MATCHING (QPM)

(75) Inventors: Liejia Qian, Shanghai (CN); Yongzhi Wang, Shanghai (CN); Peng Yuan, Shanghai (CN); Jingui Ma, Shanghai (CN); Guoqiang Xie, Shanghai (CN)

(73) Assignee: Fudan University, Shanhgai (CN)

( * ) Notice: Subject to any disclaimer, the term of this patent is extended or adjusted under 35 U.S.C. 154(b) by 213 days.

(21) Appl. No.: 13/372,466

(22) Filed: Feb. 13, 2012

(65) Prior Publication Data

US 2013/0075610 A1   Mar. 28, 2013

(51) Int. Cl.
*G01J 1/00* (2006.01)
*G01J 11/00* (2006.01)
(52) U.S. Cl.
CPC ........................................ *G01J 11/00* (2013.01)
USPC ....................................................... 250/338.1
(58) Field of Classification Search
CPC .............................. G01J 11/00; G02F 1/3544
USPC ........................................... 250/338.1–338.5
See application file for complete search history.

(56) References Cited

U.S. PATENT DOCUMENTS

| | | | | |
|---|---|---|---|---|
| 5,528,612 A | * | 6/1996 | Scheps et al. | 372/23 |
| 5,737,347 A | * | 4/1998 | Scheps et al. | 372/23 |
| 6,898,000 B2 | * | 5/2005 | Jungerman et al. | 359/328 |
| 7,696,479 B2 | * | 4/2010 | DeCamp et al. | 250/339.06 |

\* cited by examiner

*Primary Examiner* — Kiho Kim

(57) ABSTRACT

A high-fidelity device for single-shot pulse contrast measurement based on quasi-phase-matching includes a generating unit of sampling pulse, a high-fidelity cross-correlation unit of nonlinear SFG and a high-sensitivity signal detecting unit. An innovatively designed dot-mirror or dot-attenuator and correlating crystal. The dot-mirror or dot-attenuator is adopted to suppress the scattering noise, which is mainly induced by air scattering of the main peak of the correlation beam, to a level below the real pulse background. While the crystal is introduced into the device as a nonlinear correlation crystal to move two kinds of artifacts introduced by a correlation process respectively out of the temporal window and behind the main pulse, so that effects of the artifacts on the contrast measurement in a pulse leading edge are removed, without obviously affecting other parameters. The device is also fit for measuring contrasts of high-power lasers of various wavelengths.

3 Claims, 3 Drawing Sheets

HIGH-FIDELITY DEVICE FOR SINGLE-SHOT PULSE CONTRAST MEASUREMENT BASED ON QUASI-PHASE-MATCHING (QPM)

BACKGROUND OF THE PRESENT INVENTION

1. Field of Invention

The present invention relates to a laser technology, and more particularly to a device for single-shot pulse contrast measurement.

2. Description of Related Arts

Temporal contrast (i.e. signal to noise ratio) of the laser pulse is one major challenge of the intense femtosecond chirped pulse amplifier. It not only requires designing more precise laser systems and pulse cleaning technology, but also challenges the technology of measuring the pulse contrast. The pulse contrast measurement mainly depends on the nonlinear correlation technology, i.e. retrieving a pulse contrast curve of an under-test pulse through realizing a cross-correlation of sum frequency generation (SFG) or difference frequency generation (DFG) between a clean sampling pulse and the under-test pulse in a nonlinear crystal and measuring the dependence of the SFG signal (or the idler) on the time delay. The clean sampling pulses are basically produced by the second harmonic generation (SHG) of the under-test pulse. At present, the time-scanning measurement has a dynamic range of $10^{11}$ and has been commercialized into products. However, most intense CPA (chirped pulse amplification) systems have a low pulse repetition rate or even no pulse repetition rate, so the technology of measuring pulse contrast in the single-shot must be developed. The system for measuring the pulse contrast usually reaches a certain temporal window through the time-to-space encoding. Recently the temporal window and the dynamic range of the single-shot measurement have respectively reached 200 ps and $10^9$.

What is extremely important for the single-shot pulse contrast measurement is the capability to precisely illustrate the pulse background and the fine structure possibly existing therein. This not only necessitates a high dynamic range and temporal resolution, but also requires a high-fidelity contrast measurement. With time-to-space encoding and the image relay from the correlating crystal to the multi-element detector, the fidelity issue of single-shot measurement of will be more complex than that of time-scanning measurement. In single-shot cross-correlator, two factors in forms of scattering noise and artificial spikes may easily degrade the measurement fidelity. The scattering noise can submerge the real background and tiny structure of the measured trace. While the artifacts, mainly caused by multi-reflection in essence, can be confused with or cover the real structures. Both of the two factors result in an uncorrected measurement.

SUMMARY OF THE PRESENT INVENTION

According to existing disadvantages of conventional single-shot pulse contrast measurement, an object of the present invention is to provide a high-fidelity device for single-shot pulse contrast measurement which is able to remove effects of scattering noise and two kinds of artifacts introduced by a correlation process under a condition of maintaining a high dynamic range, a large temporal window and a relatively high resolution.

Thus, the present invention provides an innovatively designed dot-mirror or dot-attenuator and correlating crystal. The dot-mirror or dot-attenuator is adopted to suppress the scattering noise, which is mainly induced by air scattering of the main peak of the correlation trace, to a level below the real pulse background. While the crystal is introduced into the device as a nonlinear cross-correlation crystal to move the two kinds of artifacts introduced by the correlation process respectively out of the temporal window and behind the main pulse, in such a manner that the effects of the artifacts on measurement results are removed and the single-shot measurement of the contrast in a pulse leading edge is accomplished, without obviously affecting the other parameters (the temporal window, the dynamic range and the temporal resolution) of the measurement device.

The present invention provides the high-fidelity device comprising a generating unit of sampling pulse, a high-fidelity cross-correlation unit of SFG and a high-sensitivity signal detecting unit. A near-infrared laser pulse emitted by a laser source is divided into two parts by a beam splitter. A first part is for pumping an optical parametric generation-optical parametric amplification (OPG-OPA) system to produce a sampling pulse having a mid-infrared wavelength and cleaner than an under-test pulse; a second part is the under-test pulse.

The generating unit comprises an OPG-OPA system, a first retarder, a first filter and two telescopes. The first part of the laser beam emitted by the near-infrared light source pumps the OPG-OPA system to produce the sampling pulse having a mid-infrared waveband and cleaner than the under-test pulse, after an adjustment of a certain beam contracted by the telescope and a certain time delay by the first retarder.

The high-fidelity cross-correlation unit comprises a nonlinear cross-correlation crystal, a second retarder, a periscope, two telescopes and two plano-concave cylindrical lenses. A polarization direction of the under-test pulse is changed by the periscope to be the same as that of the sampling pulse (both are e lights for the correlation crystal). Then the sampling pulse and the under-test pulse are respectively expanded by the respective telescope and one-dimensionally focused by the two respective plano-concave cylindrical lenses onto the nonlinear correlation crystal. In the nonlinear correlation crystal, the two beams (the under-test beam and the sampling beam) will correlate in the form of SFG at a non-colinear angle of 30 degrees to 40 degrees and with a phase matching method of e+e→e to produce a correspondent SFG beam distributed along the transverse space, wherein the nonlinear correlation crystal is a piece of lithium niobate (LNB) crystal comprising a periodically-poled part and an unpoled wafer.

The high-sensitivity signal detecting unit comprises a dot-mirror or dot-attenuator, an adjustable neutral attenuator, three plano-convex cylindrical lenses, a fiber array, a bandpass filter and a highly sensitive and quickly answering photomultiplier tube (PMT), The dot-mirror or dot-attenuator is placed right behind the correlating crystal to attenuate the main peak of the SFG beam, so that the air scattering noise, mainly induced by the main peak, can be suppressed. The fiber array comprises 64 to 126 fibers gradually elongated at regular length and respectively attached with fiber attenuators of different attenuation multipliers according to different signals of each channel. The fiber array changes the correlation signal distributed along the space into a series of pulses with equal time intervals and relatively uniform intensities. The series of pulses pass through the second filter and are received and changed into electric signals by the photomultiplier tube. The electric signals are analyzed by a computer to produce a contrast curve of the under-test pulse.

The present invention removes the two kinds of artifacts introduced by the correlation process. The first kind (artifact type I) is formed in an SFG process (in a leading edge) between the multi-reflection of the sampling pulse on front surface and back surface of the crystal and the under-test pulse, or in another SFG process (in a trailing edge) between the multi-reflection of pulse under test on the front surface and back surface of the crystal and the sampling pulse. A1 and A2, and B1 and B2 are light rays of the under-test beam and sampling beam respectively, correspondently showed in FIG. 3(a), wherein A1 and B1 are correlated to form a main peak of the correlation beam; A2 and RB2 which is B2 reflected on the front surface and back surface of the crystal, are correlated to form an artifact type I. In the same manner, another artifact type I corresponding to the sampling pulse and the reflected under-test pulse is formed at another side of the main peak of the correlation signals. The second kind (artifact type II) is formed through multiple reflections back and forth of SFG beam on the front surface and the back surface of the crystal, correspondently showed in FIG. 3(b). A temporal interval between the artifact type I and the main peak thereof mainly depends on the length of the crystal and a refractive index in the crystal, and thus by elongating the length of the crystal the artifact type I is moved out of an effective temporal window. However, simply elongating the length of the crystal will reduce a temporal resolution of the device at the same time, which can be avoided through periodically polarizing only the part of the relatively long LNB crystal base plate (FIG. 3(c)), wherein the temporal interval between the artifact and the main peak of the SFG beam depends on the length of the whole crystal and the resolution of the device depends on the length of the polarized part of the crystal. For the artifact type II, the main peak are reflected at the trailing edge thereof or vertically reflected (the measurement of the pulse contrast only focuses on the leading edge of the pulse). In designing phase matching conditions in the correlation process, an application of a QPM structure provides an extra freedom to allow the artifact type II to be reflected to be behind the main peak through designing the polarization period of the crystal and the angle of the phase matching (FIG. 3(d)).

The device of the present invention accomplishes a high-fidelity measurement of the contrast in the pulse leading edge and is able to measure contrasts of intense pulses having various wavelengths as well.

1—near-infrared pulse laser source; 2—near-infrared pulse laser; 3—first beam splitter; 4—laser beam for pumping OPG-OPA system; 5—second beam splitter; 6—first telescope; 7—first nonlinear crystal; 8—near-infrared signal beam produced for OPG; 9—first filter; 10—first reflecting mirror; 11—second reflecting mirror; 12—third reflecting mirror; 13—second telescope; 14—first retarder; 15—second nonlinear crystal; 16—clean mid-infrared sampling beam produced for OPA; 17—fourth reflecting mirror; 18—fifth reflecting mirror; 19—third telescope r; 20—first concave cylindrical reflecting mirror; 21—under-test pulse beam; 22—periscope system; 23—fourth telescope; 24—second retarder; 25—sixth reflecting mirror; 26—second concave cylindrical reflecting mirror; 27—SFG correlation crystal; 28—SFG signal; 29—dot-mirror or dot attenuator; 30—adjustable neutral attenuator; 31—seventh reflecting mirror; 32—first cylindrical lens; 33—second cylindrical lens; 34—third cylindrical lens; 35—fiber array; 36—second filter; 37—PMT; 38—A/D convertor; 39—computer.

DETAILED DESCRIPTION OF THE PREFERRED EMBODIMENT

Combined with the drawings, further description of the present invention is following.

Figure 1:
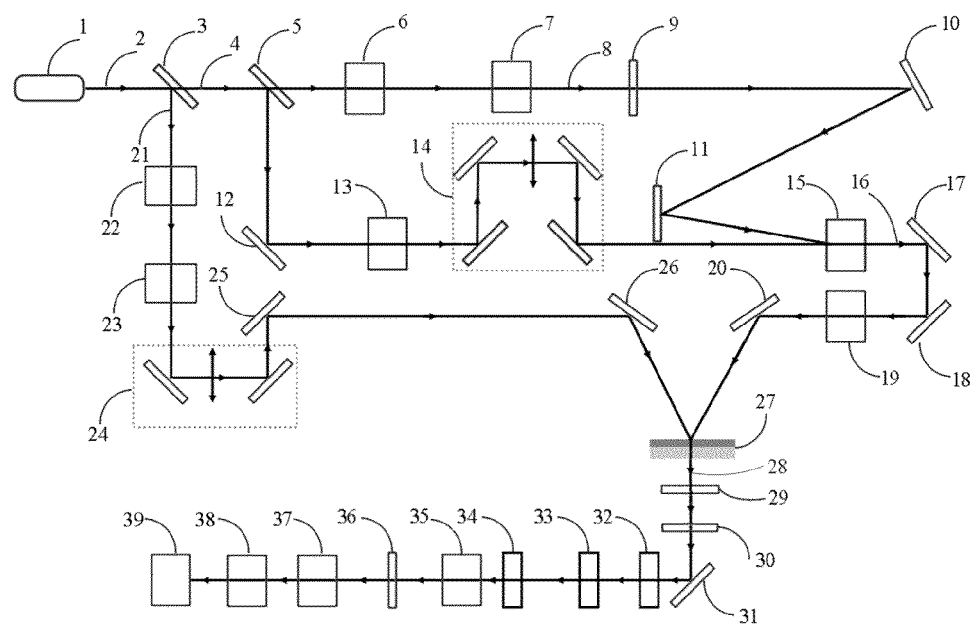
FIG. 1 is a sketch view of a device for a single-shot pulse contrast measurement according to a preferred embodiment of the present invention.

Referring to FIG. 1 of the drawings, a high-fidelity device for single-shot pulse contrast measurement based on QPM comprises a generating unit of sampling pulse, a high-fidelity cross-correlation unit of SFG and a high-sensitivity signal detecting unit.

A pulse laser 2 emitted by a near-infrared laser source 1 is divided into two parts by a beam splitter 3. A first part of the pulse laser 2 is for pumping a pulse laser 4 of an OPG-OPA system for further producing a sampling pulse having a long wavelength; a second part of the pulse laser 2 is an under-test laser 21.

The generating unit mainly comprises a first telescope 6, a second telescope 13, an OPG-OPA system, a first retarder 14 and a first filter 9. The OPG-OPA system comprises a second beam splitter 5, a first nonlinear crystal 7, and a second nonlinear crystal 15 (the first nonlinear crystal 7 and the second nonlinear crystal 15 are LNB crystals); the pulse laser 4 is divided into two parts by the second beam splitter. A first part of the pulse laser 4 is contracted by the first telescope 6 and incidents into the first nonlinear crystal 7 for an OPG process to produce a near-infrared beam 8. Then the near-infrared beam 8 is filtered by the first filter 9 to remove the residual pumping beam and produce a mid-infrared beam at the same time. The mid-infrared beam orderly passes through the first reflecting mirror 10 and the second reflecting mirror 11 and reaches the second nonlinear crystal 15 to be a signal beam of an OPA process. The second part of the pulse laser 4 passes through the third reflecting mirror 13 and the first retarder 14 and incidents into the second nonlinear crystal 15 as a pumping pulse of the OPA process. A clean mid-infrared idle beam 16 is produced in the OPA process, which is a sampling pulse of a correlation process.

The high-fidelity cross-correlation unit mainly comprises a third telescope 19, a fourth telescope 23, a periscope system 22, a second retarder 24, a first cylindrical concave lens 20, a second cylindrical concave lens 26 and an SFG correlation crystal 27. The sampling beam 16 produced by the OPA process are orderly reflected by the third reflecting mirror 17 and the fourth reflecting mirror 18, expanded appropriately by the third telescope 19 and reflected and one-dimensionally focused on the SFG nonlinear crystal 27 by the first cylindrical concave lens 20. A polarization direction of the pumping pulse 21 is rotated by the periscope system to be the same as that of the sampling pulse. Then the under-test beam 21, an e light for the SFG crystal, is expanded by the fourth telescope 23 and reaches the second cylindrical concave lens 26 after a certain delay by the second retarder 24 and a reflection by the sixth reflecting mirror 25. And under-test beam 21 is reflected and one-dimensionally focused onto the SFG crystal 27 by the second cylindrical concave lens 26. The under-test pulse and the sampling pulse are SFG correlated at a non-colinear angle of 30 degrees to 40 degrees and in a phase matching method of e+e→e in the SFG crystal to produce an SFG beam 28 distributed along the transverse space.

The high-sensitivity signal detecting unit mainly comprises a dot-mirror or dot-attenuator 29, an adjustable neutral attenuating plate 30, a seventh reflecting mirror 31, a first cylindrical lens 32, a second cylindrical lens 33, a third cylindrical lens 34, a fiber array 35, a second filter 36, a PMT 37, an A/D convertor 38 and a computer 39. After being emitted from the back surfaces of the SFG crystal 27, the SFG beam 28 passes through the dot-mirror or dot-attenuator 29 having an attenuation value of 10 times to 100 times and a diameter of 1 mm to 2 mm so as to attenuate a strongest part of an intermediate peak thereof, in such a manner that an air scattering caused by the SFG beam 28 is prevented from affecting a finally measured signal background thereof; then the SFG beam is reflected onto the first cylindrical lens 32 by the adjustable neutral attenuating plate 30 and the seventh reflecting mirror 31. The first cylindrical lens 32 is placed at a distance of one focal length behind the back surfaces of the crystal to vertically collimate the SFG beam. The collimated SFG beam passes through the second cylindrical lens 22 to horizontally image, wherein an identical image, an enlarged image or a reduced image can be formed by adjusting a distance between the second cylindrical lens and the back surface of the crystal and a fiber receiving end surface based on practical needs. The light beam passes through the imaging lenses and reaches the third cylindrical lens 34 to be focused thereby along a vertical plane. The SFG signal is coupled into the fiber array 35. The fiber array 35 comprises 64 to 126 fibers gradually elongated at regular length and respectively attached with fiber attenuators of different attenuation multipliers according to different signals of each channel. The correlation signals distributed along the space are changed into a series of pulses with equal time intervals and relatively uniform intensities by the fiber array 35. The light emitted out from another end of the fiber array 35 is filtered by the second filter 36 and incidents onto the high-sensitivity PMT 37. A simulated pulse electric signal outputted by the PMT are converted by the A/D convertor 38 and transmitted into the computer 39. The computer 39 produces a curve of a shape of the under-test pulse after a series of data processing.

Figure 3:
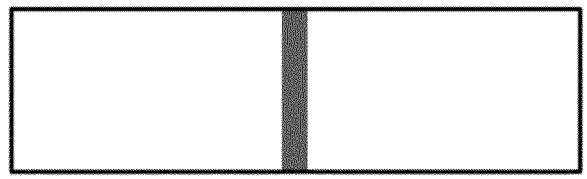
FIG. 3 is a sketch view of a dot-mirror or dot-attenuator.

Compared with the conventional scanning measurement device, the single-shot measurement device retrieves a higher background of the correlation signal than the scanning measurement device does, mainly because scattering noise affects the measurement results only in the single-shot measurement. Many factors may lead to scattering. The air scattering is recognized as a main factor causing scattering by excluding other factors (including transmitting components and the correlation crystal). The dot-mirror or dot-attenuator 29 is placed behind the crystal to remove the effects of the air scattering so as to produce a pulse background matching with the scanning measurement results ($\sim 10^{-7}$). As is shown in FIG. 3, a grey part in the middle of the dot-mirror or dot-attenuator 29 has a reflecting or attenuating film and a blank part thereof is transparent.

Figure 2:
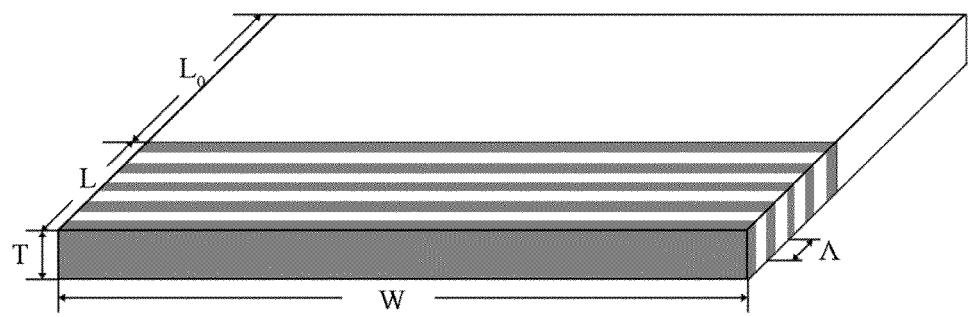
FIG. 2 is a front view of a designed periodically-poled lithium niobate (PPLN) crystal (a nonlinear cross-correlation crystal) according to the preferred embodiment of the present invention.
Figure 4:
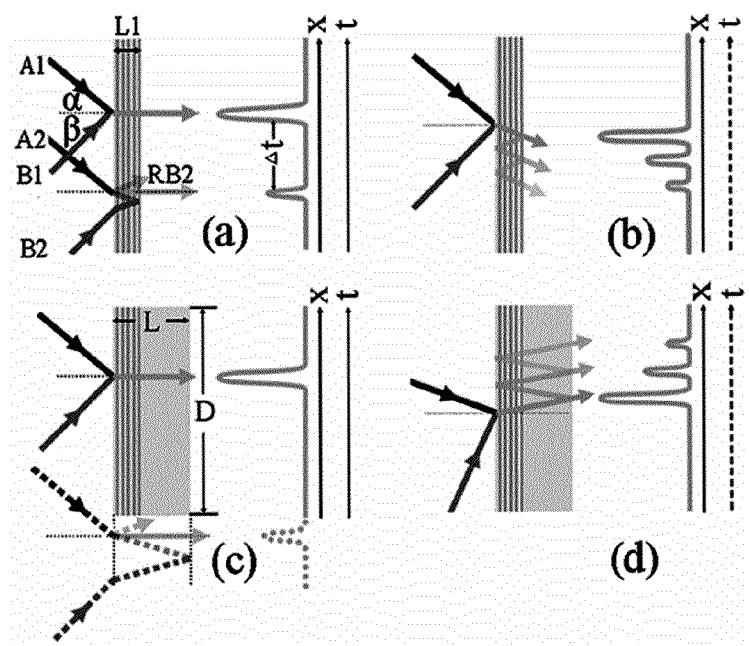
FIG. 4 is a sketch view of basic principles of forming and removing of two kinds of artifacts according to the preferred embodiment of the present invention.

In the embodiment process, in order to clearly indicate a process and a final result of removing the scattering noise and artifacts, a common PPLN crystal, which has a length (L) of 0.5 mm to 1 mm, a width (W) of 10 mm to 15 mm, a thickness (T) of 0.5 mm to 1 mm, a polarization period ($\Lambda$) of 6 $\mu$m to 9 $\mu$m and a polarization direction in parallel with front surface and back surface thereof, is used as an SFG correlation crystal. As FIG. 4(a) shows, a curve with open symbols illustrates correlation signals of the device without the dot-mirror or dot-attenuator 29 and a curve with solid symbols illustrates correlation signals of the device with the dot-mirror or dot-attenuator 29. The comparison thereof shows that the dot-mirror or dot-attenuator prevents the air scattering. On the curve with solid symbols of FIG. 4(a), two small peaks around 1% of the main peak and located at ±15 ps are the artifacts type I. With the phase matching condition unchanged, the SFG correlation crystal is changed into a specially designed crystal (FIG. 2) which further comprises an unpoled zone ($L_0$) having a length of 2 mm to 4 mm and a periodically-poled zone having a length (L), a crystal width (W), a thickness (T), a polarization period ($\Lambda$) and a polarization direction identical with the common PPLN crystal. As is shown in FIG. 2(b), the artifact type I has been removed in the temporal window. Two respective measurements at ±43 ps by moving the second retarder 24 (FIG. 2(a)) show that two pulses have been moved to ±43 ps. And also two small peaks respectively appearing at −2.5 ps and −5 ps of the leading edge of the main peak are classified as a first order artifact and second order artifact type II based on time locations and relative intensities thereof. The artifacts type II are reflected to a trailing edge of the main peak by changing the phase matching condition (FIG. 2(c)), wherein two small peaks appearing at 1.5 ps and 3 ps are the artifacts type II after the adjustment and two small peaks still exist in the leading edge of the pulse (respectively at 7 ps and 14 ps).

Figure 5:
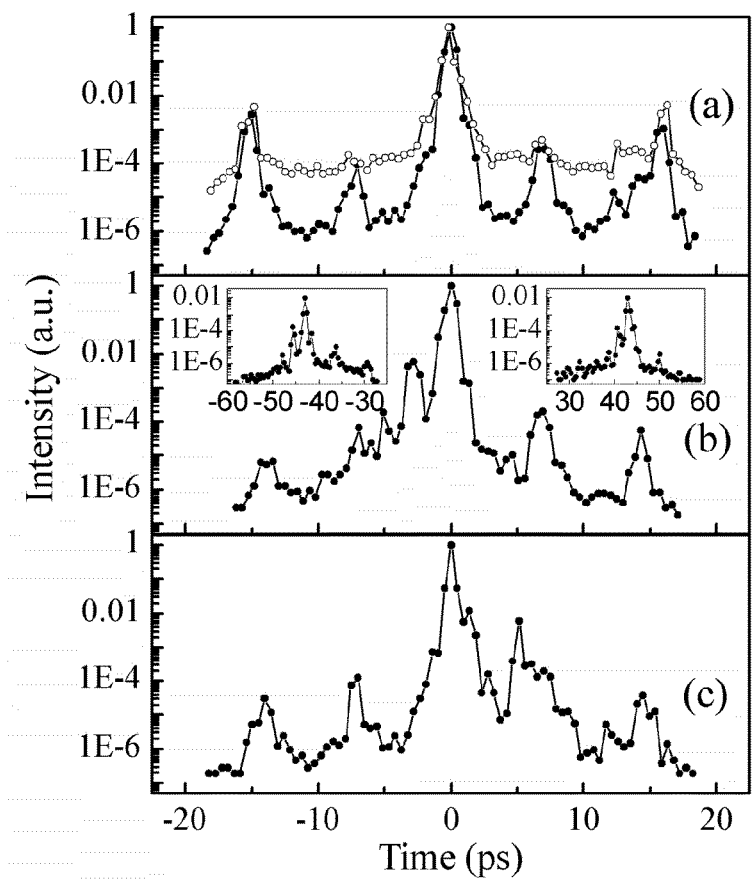
FIG. 5 is a sketch view of a set of different correlation curves of pulse contrast produced under different conditions: without and with the dot-mirror or dot-attenuator, different correlation crystals and different phase matching conditions, according to the preferred embodiment of the present invention.
Figure 6:
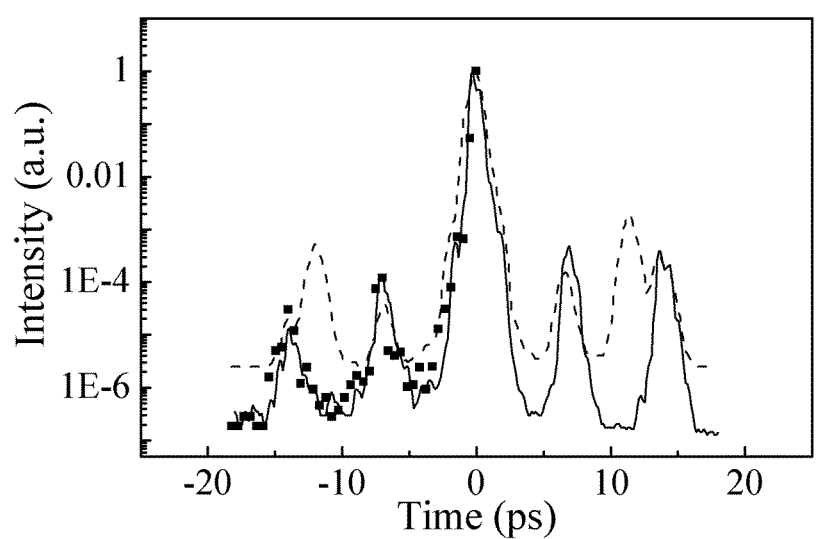
FIG. 6 is a sketch view of two curves of pulse contrast detected by time-scanning measurement as a comparison with a single-shot measurement result according to the preferred embodiment of the present invention.

In order to prove that the above two small peaks really exist in the under-test pulse, two conventional time-scanning devices for measuring pulse contrast are built to compare measurement results of (FIG. 5) the single-shot measurement results. The two time-scanning devices respectively adopt a 400 nm pulse (a dotted line) and a 3.3 $\mu$m pulse (a solid line) as sampling pulse, wherein a pulse background detected by the time-scanning device adopting the 3.3 $\mu$m pulse is close to a real background because the correlation signal does not degenerate with an inputted wavelength. In FIG. 5, discrete symbols indicate data of the single-shot measurement. By comparing the curves of FIG. 5, the results of the two time-scanning methods both include the two small peaks of the leading edge. Thus the two small peaks are classified as a real temporal structure of the under-test pulse. By comparing with the single-shot measurement results, the device for measuring single-shot pulse contrast does not only precisely measure the real structure of the under-test pulse, but also retrieves the background well matching with the background detected by the time-scanning method adopting the 3.3 $\mu$m pulse as the sampling pulse. Thus it is proved that the present invention is able to make a measurement of high-fidelity about the contrast of the pulse leading edge.

Thus the device for single-shot pulse contrast measurement innovatively accomplishes the high-fidelity measurement of the contrast of the pulse leading edge. At the same time, the device is also able to measure contrasts of intense lasers having various wavelengths because of flexibly designed polarization periods of the QPM crystals.

What is claimed is:

1. A high-fidelity device for single-shot pulse contrast measurement based on quasi-phase-matching (QPM), comprising a generating unit of sampling pulse, a high-fidelity cross-correlation unit of nonlinear sum frequency generation (SFG)

and a high-sensitivity signal detecting unit, wherein a beam splitter is for dividing a near-infrared laser pulse emitted by a laser source into a first part of a sampling pulse and a second part of an under-test pulse;

said generating unit comprises an optical parametric amplification-optical parametric generation (OPA-OPG) system, a first retarder, a first filter and two telescopes, wherein a part of a pulse laser emitted by a near-infrared light source is orderly contracted by said telescope and delayed in time by said retarder to pump said OPA-OPG system to produce a sampling pulse having a mid-infrared waveband and cleaner than the under-test pulse;

said high-fidelity cross-correlation unit comprises a nonlinear correlation crystal, a second retarder, a periscope, two telescopes and two plano-concave cylindrical lenses, wherein a polarization direction of the under-test pulse is changed by said periscope to be the same as that of the sampling pulse, wherein the sampling pulse and the under-test pulse are respectively expanded by said respective telescope and one-dimensionally focuses onto said nonlinear correlation crystal by said two respective plano-concave cylindrical lenses, in which the sampling pulse and the under-test pulse are correlated at a non-colinear angle of 30 degrees to 40 degrees and in a phase matching method of e+e→e to produce a correspondent SFG correlation signal distributed along the transverse space, and wherein said nonlinear correlation crystal is made through periodically polarizing only a part of a lithium niobate (LNB) crystal, wherein the LNB crystal is elongated compared to a common LNB crystal and has only said part periodically polarized;

said high-sensitivity signal detecting unit comprises a dot-mirror or dot-attenuator, a neutral attenuating plate, three plano-convex cylindrical lenses, a fiber array, a second filter and a highly sensitive and quickly answering photomultiplier tube (PMT), wherein said fiber array comprises 64 to 126 fibers gradually elongated at regular space and fiber attenuators of different attenuation multiples are respectively attached with said fibers based on different signals of each channel; the correlation signals distributed along the space is change by said fiber array into a series of pulses with equal time intervals and relatively uniform intensities; the series of pulses pass through said second filter and are received and changed into electric signals by said PMT; a computer analyzes the electric signals to produce a contrast curve of the under-test pulse;

said OPG-OPA system is an optical parametric generation-optical parametric amplification system.

2. The high-fidelity device, as recited in claim 1, wherein said generating unit comprises said first telescope, said second telescope, said OPG-OPA system, said first retarder, said first filter, wherein said OPG-OPA system comprises a second beam splitter, a first nonlinear crystal and a second nonlinear crystal, wherein the pulse laser is divided into the first part and the second part by said second beam splitter, the first part is contracted by said first telescope and incidents into said nonlinear crystal for an OPG process to produce a near-infrared beam; said first filter removes residual pumping the near-infrared pulse and produces an mid-infrared pulse; a first reflecting mirror and a second reflecting mirror reflect the mid-infrared beam so that the mid-infrared beam reaches said second nonlinear crystal as a signal pulse of an OPA process; a third reflecting mirror reflects the second part into said first retarder; the second part is further incidents into said second nonlinear crystal as a pumping pulse of said OPA process which produces a clean mid-infrared idle beam, i.e., a sampling pulse of a correlation process;

said high-fidelity cross-correlation unit comprises said third telescope, said fourth telescope, a periscope system, said second retarder, said first cylindrical concave lens, said second cylindrical concave lens and an SFG correlation crystal, wherein said third reflecting mirror and a fourth reflecting mirror orderly reflects the sampling beam which is produced in said OPA process, further expanded by said third telescope and reflected and one-dimensionally focuses onto said SFG nonlinear crystal by said first cylindrical concave lens; the polarization direction of the under-test pulse is changed by said periscope system to be the same as that of the sampling pulse; and then the under-test pulse, an e light for said SFG crystal, is expanded by said fourth telescope; said second retarder delays and a sixth reflecting mirror reflects the under-test pulse, in such a manner that the under-test pulse reaches said second cylindrical concave lens and is reflected and one-dimensionally focused onto said SFG crystal, in which the under-test and the sampling pulse are correlated at the non-colinear angle of 30 degrees to 40 degrees and in the phase matching method of e+e→e to produce an SFG beam distributed along the transverse space;

said high-sensitivity signal detecting unit comprises an dot-mirror or dot-attenuator, an adjustable neutral attenuating plate, a seventh reflecting mirror, said first cylindrical lens, said second cylindrical lens, said third cylindrical lens, said fiber array, said second filter, said PMT, an A/D convertor and said computer, wherein after being emitted from a back surface of said SFG crystal, the SFG beam passes through said dot-mirror or dot-attenuator of an attenuation value of 10 times to 100 times and a diameter of 1 mm to 2 mm to attenuate a strongest part of an intermediate peak thereof, in such a manner that an air scattering caused by the SFG beam is prevented from affecting a finally detected signal background; and then the SFG beam is reflected onto said first cylindrical lens by said adjustable neutral attenuating plate and said seventh reflecting mirror; said first cylindrical lens is place at a distance of one focal length behind said back surface of said crystal to vertically collimate the SFG beam and the collimated SFG beam passes through said second cylindrical lens to horizontally image; said SFG beam passes through said imaging lens, reaches said third cylindrical lens to be focused thereby along a vertical plane and is coupled into said fiber array; said fiber array comprises 64 to 126 fibers gradually elongated at regular length and attached with said fiber attenuators of different attenuation multipliers based on the different signals of each channel; the correlation signals distributed along the space is change by said fiber array into a series of pulses with equal time intervals and relatively uniform intensities; the light emitted by another end of said fiber array are filtered by said second filter and incident onto said highly sensitive PMT which outputs a simulated pulse electric signal; said A/D convertor converts and transmits the simulated pulse electric signal into the computer; said computer produces a contrast curve of the under-test pulse after a series of data processing.

3. The high-fidelity device, as recited in claim 1, wherein said dot-mirror or dot-attenuator has a reflecting or attenuating film and a blank part thereof is transparent, which is placed behind said correlation crystal to attenuate a main peak of SFG beams to prevent effects of air scattering.

* * * * *